United States Patent Office 3,563,654
Patented Feb. 16, 1971

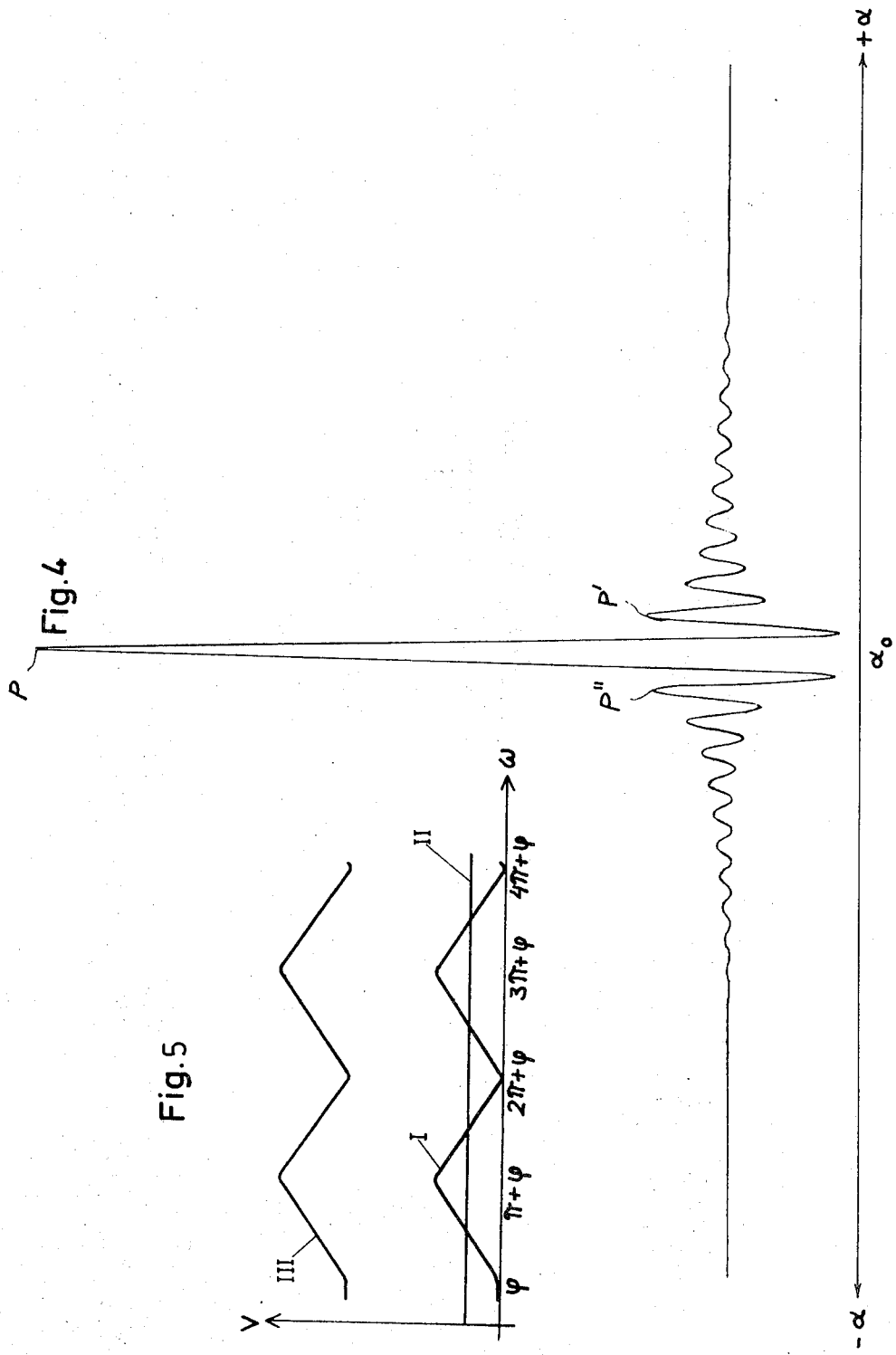

3,563,654
SPECTROMETRIC APPARATUS WITH ROTARY ENTRANCE OR EXIT GATE
Paul Jean E. Vermande, Paris, France, assignor to Office National d'Etudes et de Recherches Aerospatiales (O.N.E.R.A.), Chatillon, Bagneux, France
Filed Feb. 26, 1968, Ser. No. 709,167
Claims priority, application France, Feb. 28, 1967, 96,776
Int. Cl. G01j 3/00, 3/42
U.S. Cl. 356—74
10 Claims

ABSTRACT OF THE DISCLOSURE

A spectrometer with matching entrance and exit gates each divided into two multiplicities of zones of different transmissivity for radiation to be analyzed, has means for rotating one of the gates about its axis to generate a rapidly varying output voltage with a fundamental frequency related to the speed of rotation whenever the radiant energy includes flux of a predetermined adjustment wavelength, i.e. that wavelength with which an interposed prism or diffraction grating produces an image of the entrance gate coinciding exactly with the exit gate. Each of these gates has a circular area angularly subdivided into an even number of identical sectors and radially subdivided by concentric circles defining together with the sector boundaries a multiplicity of arcuate zones, these zones being alternately transparent and opaque or reflecting and nonreflecting for the flux to be analyzed.

---

My present invention relates to a spectrometric apparatus of the type disclosed in commonly owned U.S. Pats. Nos. 3,211,048, 3,311,015 and 3,343,446 to Andre J. Girard wherein radiant energy to be analyzed is successively passed through an entrance or input gate, a dispersion means such as a prism or a diffraction grating, and an output or exit gate having a pattern of transmitting and nontransmitting zones so matching a corresponding pattern of the input gate that, in the presence of radiant energy carried on a predetermined adjustment wavelength, the flux passed by the transmitting zones of the entrance and exit gates is able to reach an output circuit which may include a photoelectric transducer and an indicator controlled thereby. The difference in transmissivity may be based upon the ability of the zones of the pattern to reflect or to be transluminated by impinging radiation. Thus, the two sets of zones may be respectively transparent and opaque or reflecting and nonreflecting with reference to the radiation concerned.

A characteristic feature of the zonal patterns of the radiation gates described in the above-identified patents is the fact that they are nonrepetitive in a predetermined reference direction, this direction coinciding with the spectrum-spread plane of the associated dispersive system so that exact coincidence between the exit gate and the projected image of the entrance gate will occur only for one specific wavelength.

If the output of the photoelectric transducer is plotted against the relative operating positions of the two patterns (i.e. the degree of offset of the projected image of the input pattern from the output pattern) subjected to scanning displacement in the aforesaid plane, the amplitude of that output will be zero as long as there is no coincidence at all. Upon beginning coincidence this amplitude starts to rise approximately linearly up to an off-position approaching full coincidence; the spacing of this off-position from the coincidence position may be termed a slit width by analogy with a conventional single-slit spectrometer having the same power of resolution. Such equivalent slit spectrometers inherently have a ratio of transmitted to incident radiation which is only a small fraction of that provided by the improved spectrometers of the aforementioned Girard patents. If the gate pattern consists, for example, of generally rectangular zones whose width varies progressively in the aforementioned reference direction, the slit width is represented by the width of the narrowest zone of the input pattern. Since the width ratio from the widest to the narrowest zone may be of the order of 100:1, the increase in flux transmission as compared with a conventional single-slit spectrometer of like resolving power will be readily apparent.

When scanning (or an equivalent frequency change) progresses from the aforementioned off-position to the central position of exact registry, the amplitude of the output signal rises sharply to a peak (in the case of optically similar patterns) or drops equally sharply to substantially zero (in the case of optically complementary patterns). Beyond that centered position the signal will follow a curve which is symmetrical to that already described, i.e. which has a steep ascending or descending slope up to another off-position and thereafter drops gradually to zero. If the cumulative area of one set of zones is equal to that of the other, the gently sloping portion of the curve will have approximately the same shape whether the patterns are optically identical or complementary, i.e. the amplitude in the off-positions will be half the peak amplitude attained in the centered position with optically identical patterns.

The property just described has been utilized heretofore, in connection with the spectrometers disclosed in the Girard patents, to isolate the sharply sloping central portion of the output signal from the remainder of the curve by differentially combining the energies of two partial fluxes transmitted, either alternately or concurrently, over two optically distinct paths, i.e. a first path with optically identical input and output patterns and a second path with mutually complementary patterns. The final signal is then a narrow triangular pulse occurring whenever the coincidence condition is satisfied, i.e. when the wavelength of incident radiation passes through a value corresponding to the position of the dispersion device or whenever the dispersion device is moved through a position of adjustment corresponding to the existing wavelength; since, however, the slightly inclined outer flanks of the two curves cancel only imperfectly, some secondary peaks will appear on opposite sides of the main peak of the composite scanning curve.

In many instances, the need for providing separate flux paths represents an undesirable complication requiring not only a duplication of parts but also a high degree of conformity between corresponding components, e.g. in the design of the gate patterns and in the performance characteristic of the respective photoelectric transducers. Where a single photocell is used to receive the radiation alternately transmitted over the two paths, special switching and signal-storing means must be provided.

In commonly owned copending U.S. application Ser. No. 411,254, filed Nov. 16, 1964 by said André G. Girard, now Pat. No. 3,383,978, means have been disclosed for relatively oscillating or rotating the two radiation gates at high speed to generate an electric output exhibiting a distinct peak in a coincidence position if radiation of the proper frequency is present, thus eliminating the necessity for the separate transmission of radiant energy over two different paths. This is particularly desirable where the radiation to be detected lies in the infrared region of the spectrum inasmuch as, in such case, locally generated heat may introduce an error factor.

Since the type of radiation gate described in the last mentioned Girard patent is effective only in certain angular positions, its efficiency would be poor in a system in which one of the gates is completely rotated about its axis unless, as likewise proposed in that patent, this rotation occurs intermittently with a Geneva-type motion involving an extended dwell in a position in which the reference direction of the patterns registers with the plane of dispersion.

The general object of my invention is to provide a simplified spectrographic apparatus of this description adapted to operate with a continuously rotating input or output gate, as well as a novel zonal pattern to be used in a radiation gate of such apparatus.

A more particular object is to provide a one-path spectrometer whose sensitivity is increased even over that of the last-mentioned Girard system by utilizing an output signal varying periodically between a maximum and a minimum value corresponding, respectively, to full coincidence and zero coincidence.

In accordance with this invention I provide, as an input or output gate of a spectrometric apparatus of this character, a body bearing on a flat surface thereof a circular pattern which is angularly subdivided into an even number of identical sectors and is radially subdivided by concentric circles, these circles and the sectoral boundaries together defining a multiplicity of concentric arcuate zones which are aternately of high and low transmissivity for the radiation to be analyzed, i.e. are alternately transparent and opaque and/or reflecting and non-reflecting for such radiation.

When a body of this description is rotated about a transverse axis passing through the center of its circular pattern, its image will register with a matching pattern in a specific angular position corresponding to a maximum flux transmission; in a diametrically opposite position, flux transmission will be at a minimum. In contradistinction to the hitherto proposed patterns, however, the extent of coincidence changes gradually from minimum to maximum and vice versa so that the resulting output signal will follow a generally sinusoidal curve instead of having a single peak within an interval corresponding to a full revolution of the pattern.

The invention will be described hereinafter in greater detail with reference to the accompanying drawing in which:

FIG. 4 is a reproduction of a spectrograph obtained from an apparatus according to the invention, using a pair of gates of the type shown in FIG. 1;

FIG. 5 is a set of diagrams serving to explain the mode of operation of the apparatus;

Figure 1:
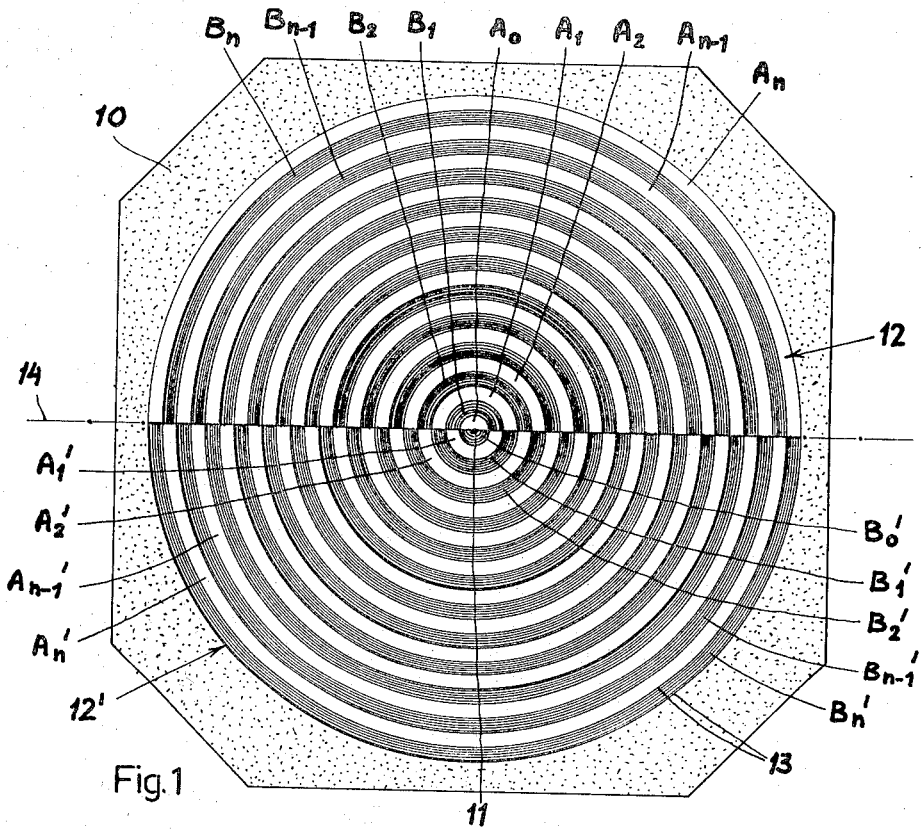
FIG. 1 is a face view of a radiation gate bearing the concentric pattern characteristic of my present improvement.

Reference is first made to FIG. 1 which shows a radiation gate 10 whose plate-shaped supporting body bears a circular pattern divided into two identical sectors 12, 12' separated by a diametrical line 14. A multiplicity of circles 13, with a center at 11, subdivide the two sectors 12 and 12' into an array of semiannular zones forming two sets of dissimilar ability to transmit incident radiation, i.e. a first set ("A") of transparent or reflecting character and a second set ("B") of opaque or non-reflecting character, depending on whether the gate 10 is to be used for translumination or for reflection. The zones of the first set have designated $A_1$, $A_2$ ... $A_{n-1}$, $A_n$ in the case of sector 12 and $A_1$, $A_2'$ ... $A_{n-1}'$, $A_n'$ in the case of sector 12', this set also including a central semicircular area $A_0$ in sector 12. Similarly, the zones of the second set have been designated $B_1$, $B_2$ ... $B_{n-1}$, $B_n$ in sector 12 and $B_1'$, $B_2'$ ... $B_{n-1}'$, $B_n'$ in sector 12', the latter sector also containing a central semicircular area $B_0'$ forming part of that second set. In the gate pattern shown in FIG. 1, the radial spacing of circles 13 and therefore the widths of the zones $A_1$–$A_n$, $A_1'$–$A_n'$, $B_1$–$B_n$ and $B_1'$–$B_n'$ is uniform.

Figure 2:
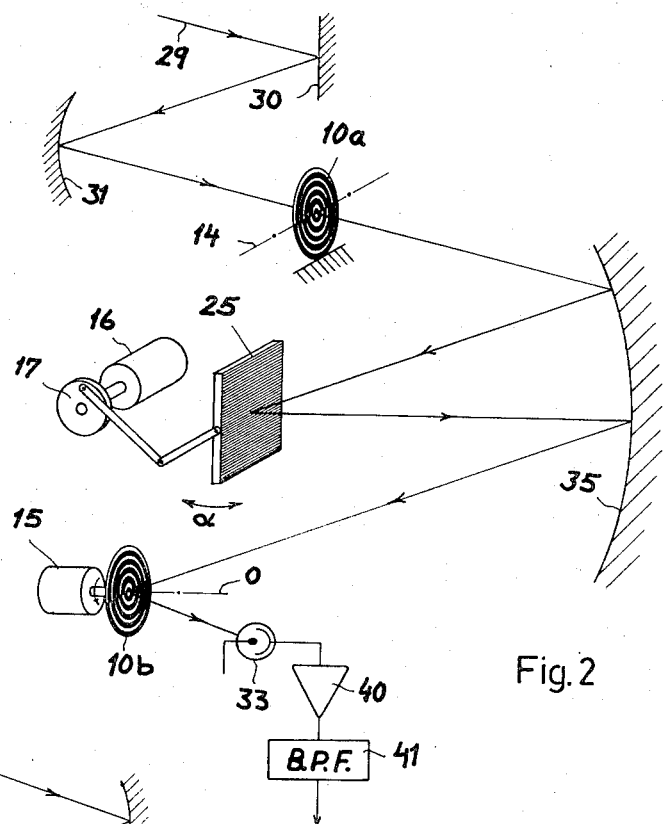
FIG. 2 is a diagrammatic view of a spectrometric apparatus utilizing a pair of gates of the type illustrated in FIG. 1.

FIG. 2 shows a spectrometric apparatus utilizing a pair of gates 10a, 10b of the type shown at 10 in FIG. 1. The apparatus comprises a plane reflector 30 for a beam 29 of incident radiation which is directed onto a concave mirror 31 designed to eliminate the divergence of the oncoming rays. The stationary entrance gate 10a is thus transluminated by a beam of parallel light rays which fall upon a large concave reflector 35 acting as a collimator. A dispersive element 25, shown as a reflecting grating, receives the radiation trained upon it by the mirror 35 and redirects it through that mirror, with an outgoing angle dependent upon wavelength, so as to project an image of gate 10a upon the gate 10b; if the magnification ratio of the projection system represented by the collimating mirror 35 is unity, the patterns of gate 10a and gate 10b have the same size. Gate 10b, however, is not stationary but is rotatable by a motor 15 about an axis 0 which passes through the center 11 of FIG. 1. Also, the highly transmissive zones (set "A") of gate 10b are assumed to be of reflecting character so that the impinging flux is redirected onto a photoelectric transducer here shown as a photocell 33 which works into an amplifier 40 and, through it, into a band-bass filter 41 whose pass band is centered on a frequency equal to the rate of rotation of gate 10b in terms of revolutions per second.

The plane of dispersion of grating 25, which, of course, includes the center of mirror 35, is perpendicular to the dividing line 14 of radiation gate 10a. Within this plane, grating 25 can be oscillated at a relatively slow rate (compared with the speed of rotation of gate 10b) by means of a motor 16 and a crank drive 17.

If the incident radiation 29 is monochromatic, and if the position of the dispersion element 25 is such that the image of gate 10a registers exactly with gate 10b, then the output of photoelectric transducer 33 will be a voltage which varies roughly sinusoidally between a maximum and a minimum value, the maximum being observed in one rotary position (i.e. when the images of the transparent zones of gate 10a coincide with the reflecting zones of gate 10b) whereas the minimum occurs in a diametrically opposite position. This voltage V has been plotted in graph I of FIG. 5 whose abscissa represents the angular displacement $\omega$ of the rotary gate 10b from any desired starting position $\varphi$ and, with constant speed of rotation, is also representative of time. Since the filter 41 is tuned to the frequency of the sine wave, an A-C voltmeter or other integrating indicator (not shown) energized through the filter registers a large output.

If the radiation frequency differs slightly from the frequency for which the dispersive element 25 is adjusted or if this element is displaced to a corresponding extent from its previous position, the semiannular zones of the two gates 10a, 10b no longer register with one another. Although the relative rotation of the two patterns may still result in some fluctuations of the output voltage, the latter no longer exhibits peaks and troughs as in the first case and may thus be regarded as generally flat; see graph II of FIG. 5.

If radiation of mixed frequencies is present, there results a composite output voltage as illustrated in graph III of FIG. 5; the filter 41 then extracts the generally sinusoidal component corresponding to the adjustment wavelength.

If the scanning drive 16, 17 is used in the presence of monochromatic radiation of unknown wavelength, a distinct peak P will occur in the output of detector 33, 40, 41 whenever the grating 25 passes through the corresponding adjustment position; this has been illustrated in FIG. 4 which shows the output voltage plotted against the swing angle $\alpha$ of the dispersive element, the position $\alpha_0$ corresponding to the dominant wavelength of the flux; in a specific case, this flux had a wavelength of 5,641 A., the source of radiation being a mercury-vapor lamp.

Figure 3:
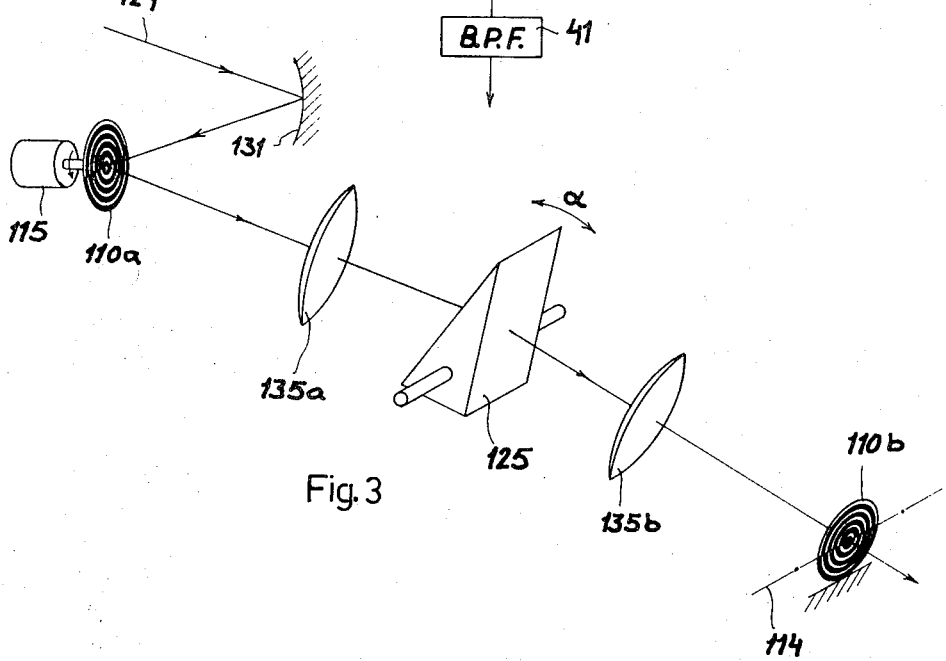
FIG. 3 is a view similar to FIG. 2, illustrating a modified apparatus according to the invention.

In FIG. 3, I have shown a modified spectrometer wherein the entrance gate 110a is rotated by a motor 115, exit gate 110b being held stationary with its dividing line 114 perpendicular to the plane of swing of a dispersive element 125 here shown as a prism. The collimator is represented in FIG. 3 by a pair of lenses 135a, 135b. The incident radiation 129, directed by a concave mirror 131 onto a face of gate 110a, is reflected by its highly transmissive zones "A" so that the output of the system reaches its peak P (FIG. 4) whenever these zones register with the corresponding zones (here transparent) of gate 110b. The system operates otherwise in a manner analogous to that of the spectrometer of FIG. 2. In both instances, as shown, the path of radiation (in the case of the adjustment wavelength) is centered on the axes of patterns 10a, 10b or 110a, 110b.

Figure 6:
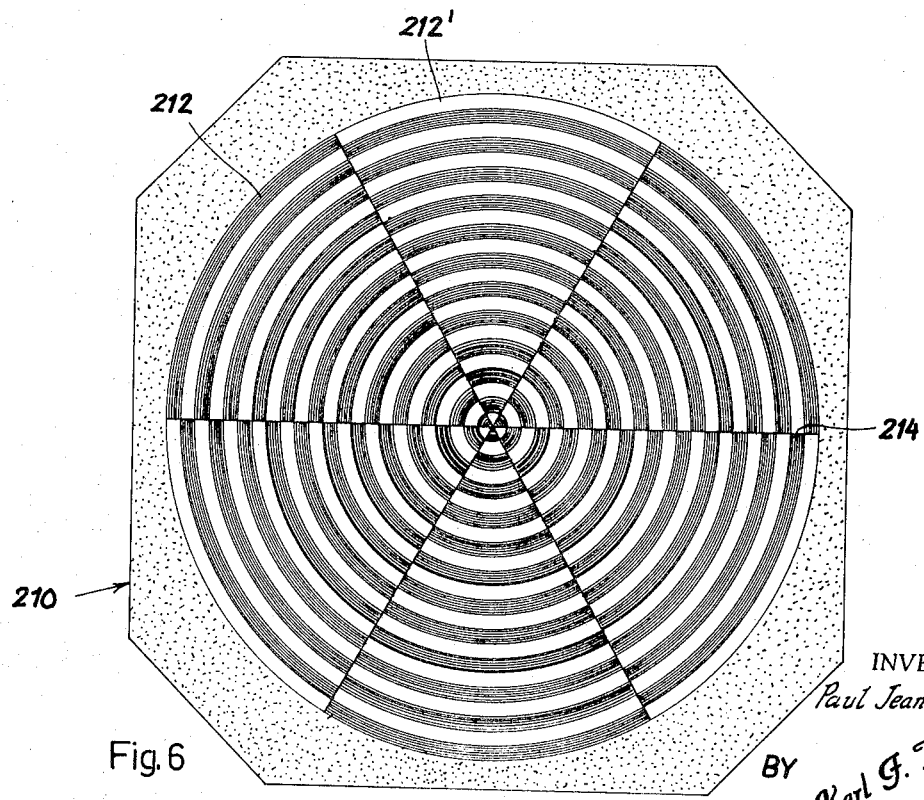
FIG. 6 is a view similar to FIG. 1, illustrating a modified gate pattern.

In order to increase the relative rate of displacement of the two gate patterns without accelerating the associated drive motor 15 or 115, I may subdivide each of these patterns into more than one pair of sectors. This has been illustrated in FIG. 6 which shows a gate 210 having three 60° sectors 212 alternating with three similar sectors 212' of complementary character, separated therefrom by diametrical lines 214. Naturally, any of these lines 214 may be perpendicular to the spectrum-spread plane of the dispersion element in the case of the stationary gate. With $m$ pairs of such sectors, the pass frequency of filter 41 should be $m$ times the rate of rotation of motor 15 or 115.

Figure 8:
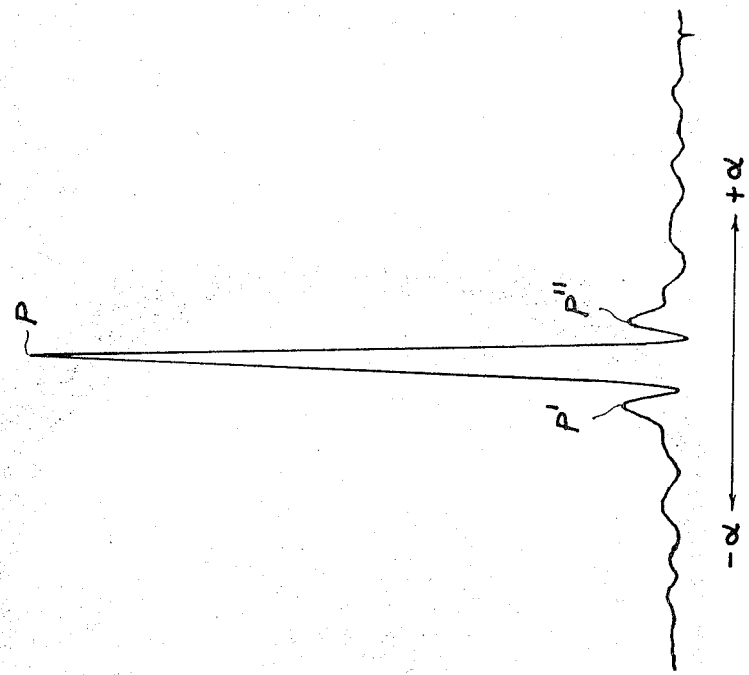
FIG. 8 is a spectrograph similar to that of FIG. 4, relating to the type of radiation gate shown in FIG. 7.
Figure 7:
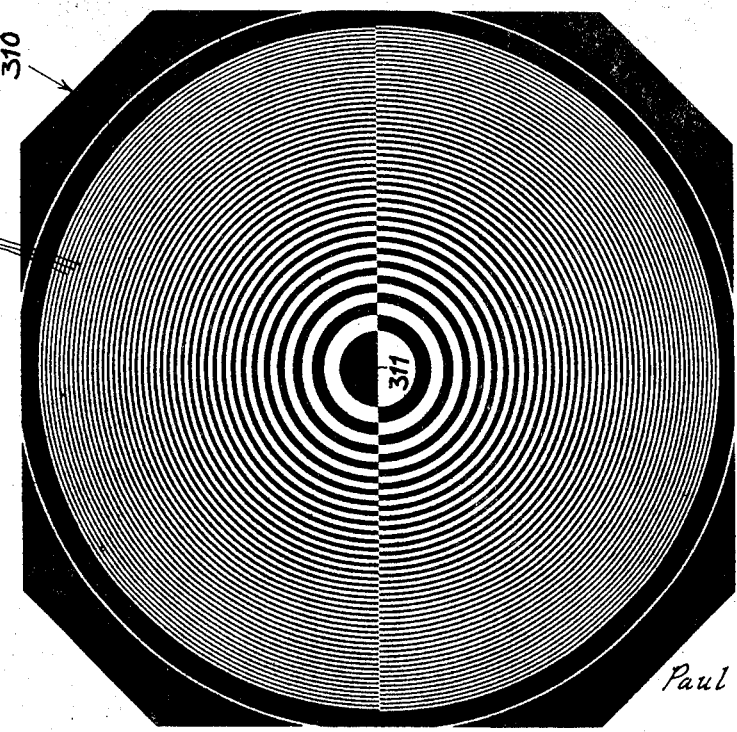
FIG. 7 is a further view similar to FIG. 1, illustrating yet another modification.

An inspection of the diagrams of FIG. 4 reveals the existence of small but still noticeable secondary peaks P', P'' adjacent the main peak P in position $\alpha_0$. These secondary peaks exist because a relative shift between the input-gate image and the output gate by the width of a semiannular zone thereof (which may be termed "slit width") of the spectrometer still results in an appreciable degree of coincidence between transparent and/or reflecting zones. This coincidence can be substantially reduced if, as illustrated in FIG. 7, a modified gate 310 is used whose concentric circles 313 are no longer equispaced but wherein, instead, the spacing of these circles progressively increases from the periphery of the pattern to the center 311. A convenient ratio of these radial distances and, therefore, of the zone widths equals the proportions of the square roots of the cardinal numbers $1, 2 \ldots n-1, n$ so that, if $n$ is on the order of 100, the innermost ring zone would be about ten times as wide as the outermost zone. A spectrograph, FIG. 8, produced with gates of this type exhibits a considerable reduction in the amplitude of the secondary peaks P', P'', compared with those of FIG. 4.

In assembling the apparatus according to my invention, one of the two conjugate radiation gates (e.g. the entrance gate) may be produced photographically from a master whereupon the other gate is made as a replica of the first gate, preferably by photographic reproduction through the associated projection system.

Naturally, the improved spectrometric apparatus herein disclosed may be modified in various respects (as by substituting photocapacitive or photoresistive means for the photocell 33 of FIG. 2, or by using the prism of FIG. 3 in combination with gates 10a, 10b of FIG. 2) without departing from the spirit and scope of my invention as defined in the appended claims.

I claim:

1. An apparatus for the spectrometric analysis of a flux of radiation, comprising:

an entrance gate and an exit gate for radiation to be analyzed, said gates having matching circular patterns each angularly subdivided into an even number of identical sectors and radially subdivided by concentric circles defining together with the boundaries of said sectors a multiplicity of concentric arcuate zones split into a first and a second set of high and low transmissivity for impinging radiation, respectively, the zones along each circle and within each sector being alternately part of said first and second sets;

a projection system for directing incident radiation, transmitted by the zones of one set of said entrance gate, onto said exit gate, said system including dispersion means with a spectrum-spread plane bisecting the patterns of said gates for casting upon the pattern of said exit gate an exactly registering image of the pattern of said entrance gate as projected with a predetermined wavelength of incident radiation, the path of said radiation being centered on the axis of the pattern of said exit gate for said predetermined wavelength;

photoelectric transducer means positioned to receive radiation transmitted by the zones of one set of said exit pattern, the rate of reception of radiant energy by said transducer means attaining a maximum value and a minimum value for said predetermined wavelength in at least one pair of diametrically opposite relative positions of said entrance and exit gates;

drive means for relatively rotating said gates with resulting rotation of said registering image and the pattern of said exit gate around their common center, thereby generating in the output of said transducer means an oscillation of a frequency related to the speed of relative rotation in the presence of radiation of said predetermined wavelength;

and circuit means in the output of said transducer means for detecting said oscillation.

2. An apparatus as defined in claim 1 wherein said circles are radially equispaced.

3. An apparatus as defined in claim 1 wherein the spacing of said circles progressively increases from the periphery of said pattern to the center thereof.

4. An apparatus as defined in claim 3 wherein said spacing varies as the square roots of consecutive cardinal numbers.

5. An apparatus as defined in claim 1 wherein said circuit means includes a filter with a narrow pass band centered on said related frequency.

6. An apparatus for the spectrometric analysis of a flux of radiation, comprising:

an entrance gate and an exit gate for radiation to be analyzed, said gates having matching circular patterns each consisting of a multiplicity of annular zones centered on a common axis and subdivided into a first and a second set of high and low transmissivity for impinging radiation, respectively, adjacent zones being part of said first and said second set, respectively;

a projection system for directing incident radiation, transmitted by the zones of one set of said entrance gate, onto said exit gate, said system including dispersion means with a spectrum-spread plane bisecting the patterns of said gates for casting upon the pattern of said exit gate an exactly registering image of the pattern of said entrance gate as projected with a predetermined wavelength of incident radiation, the path of said radiation being centered on the axis of the pattern of said exit gate for said predetermined wavelength;

photoelectric transducer means positioned to receive radiation transmitted by the zones of one set of said exit pattern, the rate of reception of radiant energy by said transducer means attaining a maximum value and a minimum value for said predetermined wavelength in at least one pair of diametrically opposite relative positions of said entrance and exit gates; drive means for rotating one of said gates about the center of its pattern, thereby generating in the output of said transducer means an oscillation of a frequency related to the speed of rotation in the presence of radiation of said predetermined wavelength;

and circuit means in the output of said transducer means for detecting said oscillation.

7. An apparatus as defined in claim 6 wherein each of said patterns is angularly subdivided into an even number of identical sectors and radially subdivided by a multiplicity of concentric circles, said zones being defined by said circles and by the boundaries of said sectors.

8. An apparatus as defined in claim 7 wherein at least two of said sectors meet along a diameter which, in the case of the nonrotating gate, is perpendicular to said spectrum-spread plane.

9. An apparatus as defined in claim 8, further including scanning means for swinging said dispersion means in said plane at a rate which is slow compared with the speed of rotation of said one of said gates by said drive means.

10. An apparatus as defined in claim 7 wherein said circles define annular areas of a width decreasing progressively from the center outwardly.

References Cited

UNITED STATES PATENTS

| | | | |
|---|---|---|---|
| 2,219,116 | 10/1940 | Sauer | 350—272 |
| 3,211,048 | 10/1965 | Girard | 250—237 |
| 3,246,557 | 4/1966 | Mertz et al. | 356—106 |

RONALD L. WIBERT, Primary Examiner

V. B. McGRAW, Assistant Examiner

U.S. Cl. X.R.

250—226; 356—79, 97, 256